United States Patent
Singh et al.

(10) Patent No.: US 9,951,749 B2
(45) Date of Patent: Apr. 24, 2018

(54) SYSTEM AND METHOD FOR TRAILING EDGE NOISE REDUCTION OF A WIND TURBINE BLADE

(71) Applicant: LM WP PATENT HOLDING A/S, Kolding (DK)

(72) Inventors: Ashish Singh, Lucknow (IN); Ganesh Ramanathan, Chennai (IN); Jitendra Bijlani, Bangalore (IN); Naveen Parihar, Bangalore (IN)

(73) Assignee: LM WP PATENT HOLDING A/S, Kolding (DK)

( * ) Notice: Subject to any disclaimer, the term of this patent is extended or adjusted under 35 U.S.C. 154(b) by 359 days.

(21) Appl. No.: 14/437,641

(22) PCT Filed: Oct. 24, 2013

(86) PCT No.: PCT/EP2013/072272
§ 371 (c)(1),
(2) Date: Apr. 22, 2015

(87) PCT Pub. No.: WO2014/064195
PCT Pub. Date: May 1, 2014

(65) Prior Publication Data
US 2015/0292522 A1   Oct. 15, 2015

(30) Foreign Application Priority Data

Oct. 26, 2012   (EP) ..................... 12190155

(51) Int. Cl.
*F03D 1/06*   (2006.01)
*F03D 7/02*   (2006.01)
*F03D 80/00*   (2016.01)

(52) U.S. Cl.
CPC ........... *F03D 1/065* (2013.01); *F03D 1/0641* (2013.01); *F03D 1/0683* (2013.01);
(Continued)

(58) Field of Classification Search
CPC ...... F03D 80/00; F03D 1/0641; F03D 1/0683; F03D 1/065; F03D 7/0296
See application file for complete search history.

(56) References Cited

U.S. PATENT DOCUMENTS 5,492,448 A * 2/1996 Perry .................. B64C 3/14
                                           416/228
6,382,561 B1 * 5/2002 Brink ................. B64C 3/14
                                           244/215
(Continued)

FOREIGN PATENT DOCUMENTS

| EP | 0 652 367 A1 | 5/1995 |
| EP | 2 479 423 A1 | 7/2012 |
| EP | 2 514 961 A1 | 10/2012 |

OTHER PUBLICATIONS

International Search Report dated Nov. 14, 2013 in International Application No. PCT/EP2013/072272.

*Primary Examiner* — Igor Kershteyn
*Assistant Examiner* — Brian P Wolcott
(74) *Attorney, Agent, or Firm* — Nath, Goldberg & Meyer; Jerald L. Meyer; Tanya E. Harkins (57) ABSTRACT

A system and method for reducing the operational noise of a blunt trailing edge of a wind turbine blade is described. The system involves increasing the trailing edge solid angle at the blade trailing edge by providing a wedge element or projection adjacent the trailing edge of the blade, the wedge element acting to provide improved mixing of the suction side and pressure side flows at the blunt trailing edge, thereby reducing the strength of vortex shedding at the trailing edge and the associated operational noise.

21 Claims, 7 Drawing Sheets

(52) U.S. Cl.
CPC ........... *F03D 7/0296* (2013.01); *F03D 80/00* (2016.05); *Y02E 10/721* (2013.01); *Y02E 10/723* (2013.01)

(56) References Cited

U.S. PATENT DOCUMENTS

| | | | |
|---|---|---|---|
| 9,440,737 B1* | 9/2016 | Cawthorne | B64C 27/615 |
| 2010/0047070 A1* | 2/2010 | Slot | F03D 1/065 |
| | | | 416/146 R |
| 2014/0093380 A1* | 4/2014 | Drobietz | F03D 1/0641 |
| | | | 416/228 |

* cited by examiner

SYSTEM AND METHOD FOR TRAILING EDGE NOISE REDUCTION OF A WIND TURBINE BLADE

CROSS REFERENCE

This is a National Phase Application filed under 35 U.S.C. 371 as a national stage of PCT/EP2013/072272, filed Oct. 24, 2013, an application claiming the benefit of European Application No. 12190155.7, filed Oct. 26, 2012, the content of each of which is hereby incorporated by reference in its entirety.

Field of the Invention

The present invention relates to a system and associated method for providing a wind turbine blade having reduced operational noise, in particular a wind turbine blade having reduced trailing edge operational noise.

Background of the Invention

One of the continued considerations for wind turbine blade design is the operational noise produced when such blades rotate, in particular for on-shore wind turbine installations. A portion of such noise is generated from airflow leaving the profile of a wind turbine blade at the blade trailing edge, and is often referred to as trailing edge noise.

As modern wind turbine blades are manufactured at increasingly longer blade lengths, the longer span of the blades results in higher relative wind speeds experienced by the blades. Accordingly, this can lead to relatively large levels of trailing edge noise.

Additionally or alternatively, wind turbine blades are sometimes produced having an airfoil profile comprising a relatively thick or blunt trailing edge. Such a profile provides various advantages over traditional tapered trailing edge profiles, including it can be relatively easier to manufacture, it is structurally stronger, and less prone to damage. However, one of the disadvantages of such a thick or blunt trailing edge profile is the relatively large levels of operational noise created by the trailing edge, primarily due to vortex shedding behind the trailing edge caused by the meeting of the suction side and pressure side flows, which can result in tonal noise formation at the trailing edge.

US Patent Application Publication No. US 2010/0047070 discloses the use of a splitter plate at a blunt trailing edge of a wind turbine blade. The splitter plate is a planar member projecting from the blunt trailing edge, which acts to reduce vortex shedding at the blade trailing edge by effectively reducing the trailing edge thickness seen between the pressure and suction side flows. However, the splitter plate can be easily damaged during blade operation, requiring on-site replacement. Furthermore, the projecting arrangement of the splitter plate can introduce complexities into the handling and maintenance operations required for a wind turbine blade.

Accordingly, it is an object of the invention to provide a system and associated method for the reduction of operational noise on a wind turbine blade having a blunt trailing edge, which results in improved reliability and blade performance compared to prior art systems.

SUMMARY OF THE INVENTION

Accordingly, there is provided a method of reducing the trailing edge noise of a wind turbine blade having an airfoil profile with a trailing edge, the wind turbine blade having a trailing edge solid angle at said trailing edge, the method comprising the steps of:

increasing the trailing edge solid angle of the trailing edge to reduce the strength of vortex shedding formed behind the trailing edge of the wind turbine blade.

As the aerodynamic flow at the trailing edge of the blade will follow the curvature of the blade preceding the trailing edge, by increasing the trailing edge solid angle the flow in the wake of the blade trailing edge will be redirected, having a larger flow angle when leaving the trailing edge when compared to prior art wind turbine blades having a standard airfoil profile. Accordingly, increasing the solid angle will enhance the mixing of the flow behind the trailing edge, which will avoid any kind of sustainable vortex shedding formations or patterns which are the cause of vortex shedding noise at the shedding frequency. Effectively, an increase in the blade sectional, or airfoil, solid angle will redirect the flow in such a way that the wake length (i.e. the velocity deficit region) behind the trailing edge will be reduced due to better mixing caused by redirection. This redirected flow results in a reduction in trailing edge vortices formed as a result of vortex shedding, which accordingly results in a reduction in the trailing edge operational noise caused by said vortex shedding.

Preferably, the trailing edge solid angle is increased such that angle of intersection of the pressure-side and suction side airflow over the airfoil profile after leaving the trailing edge of the blade is increased Preferably, the pressure-side airflow and the suction side airflow over the airfoil profile of the blade intersect in the wake of the blade trailing edge at an intersecting flow angle, wherein said step of increasing the trailing edge solid angle of the blade acts to increase said intersecting flow angle.

As the pressure- and suction-side airflows intersect at an increased angle in the wake of the blade trailing edge, there is less area for the formation of a vortex street in the blade wake. It will be understood that said flow angle may be substantially equivalent to the trailing edge solid angle presented by the wind turbine blade.

Preferably, the wind turbine blade comprises a thick trailing edge, preferably a blunt trailing edge.

Airfoil profiles having thick or blunt trailing edges provide different structural advantages to wind turbine blade construction, but can also result in considerable levels of trailing edge noise formation.

Preferably, the method comprises the steps of:

providing a wind turbine blade having an airfoil profile comprising a trailing edge, said airfoil trailing edge having a trailing edge solid angle $\Psi 1$; and providing a wedge element adjacent said trailing edge, said wedge element having a first inclined or curved or sloped surface, said first inclined surface tapered towards a first end provided at said trailing edge, said wedge element having a solid angle $\Psi 2$ at said first end, such that said wind turbine blade comprises an effective trailing edge solid angle $\Psi'=\Psi 1+\Psi 2$.

Taking a wind turbine blade based on a pre-existing airfoil profile, the blade trailing edge solid angle may be increased by providing a wedge element at the trailing edge of the airfoil profile, the resultant solid angle being a combination of the solid angle seen from the airfoil profile and the solid angle seen from the wedge element. Preferably the trailing edge is a blunt trailing edge.

Preferably, said blade profile and said wedge element are selected such that $\Psi'$ is less than 90 degrees, further preferably less than 60 degrees.

Preferably, said wedge element is provided on the pressure side or upwind side of the airfoil profile.

While the wedge element may be provided on either the suction side or the pressure side of the blade, the blade aerodynamic characteristics largely depend on the suction side profile. Accordingly, in an effort to minimize the impact on the aerodynamic performance of the blade, preferably the wedge element is located on the pressure side of the blade.

Preferably, the wedge element is provided wherein $\Psi 2$ is between approximately 5-15 degrees, preferably between approximately 5-10 degrees, further preferably approximately 7.5 degrees.

By keeping $\Psi 2$ at a relatively small angle, any potential disruption to aerodynamic performance is minimized, with a relatively significant reduction in noise output. In particular, a 5 degree increase in trailing edge solid angle is expected to result in approximately 2 dBA of a reduction in output noise, specifically blunt trailing edge noise. A 7.5 degree increase in trailing edge solid angle is expected to result in an approximate 3 dBA reduction in output noise.

In one embodiment, said wedge element is provided as an add-on device which can be attached to an existing wind turbine blade. Preferably, said wedge element is provided as a longitudinally extending wedge member adhesively attached to the wind turbine blade trailing edge.

In an alternative embodiment, said wedge element is provided as an integral part of the wind turbine blade body. Preferably, the wind turbine blade may be manufactured to have a longitudinally extending wedge-shaped section provided at the blade trailing edge, for example during a blade moulding operation.

There is also provided a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade further comprising a profiled airfoil contour including a pressure side and a suction side, as well as a leading edge and a trailing edge with a chord having a chord length extending therebetween, the profiled contour, when being impacted by an incident airflow, generating a lift, wherein said profiled contour comprises a trailing edge solid angle $\Psi 1$ at said blunt trailing edge, wherein said wind turbine blade is configured to have an increased trailing edge solid angle at said trailing edge to reduce the strength of vortex shedding formed behind the trailing edge of the wind turbine blade.

Preferably, the profiled airfoil contour comprises a thick trailing edge, preferably a blunt trailing edge.

Preferably, the wind turbine blade further comprises at least one wedge element provided on the pressure side and/or the suction side of the blade towards said trailing edge, said at least one wedge element having a first inclined or curved or sloped surface, said first inclined surface tapered towards a first end provided at said trailing edge, said wedge element having a solid angle $\Psi 2$ at said first end, such that said wind turbine blade comprises an effective trailing edge solid angle $\Psi'$ at the trailing edge of said wind turbine blade of $\Psi' = \Psi 1 + \Psi 2$.

The increased trailing edge solid angle effectively created at the blade trailing edge provides for an increased redirection of flow leaving the blade trailing edge, to reduce the effects of trailing edge vortex shedding.

Preferably, said blade and said wedge element are selected such that $\Psi'$ is less than 90 degrees, further preferably less than 60 degrees.

Preferably, said at least one wedge element is provided on the pressure side or upwind side of the airfoil profile.

Preferably, $\Psi 2$ is between approximately 5-15 degrees, preferably between approximately 5-10 degrees, further preferably approximately 7.5 degrees.

In one embodiment, said at least one wedge element comprises at least one projection extending from said first end provided at said trailing edge, said projection acting to reduce vortex shedding in the wake of the wind turbine blade trailing edge.

In one embodiment, said at least one projection comprises a splitter plate projection.

The use of a splitter plate will improve the performance of the wedge element when reducing trailing edge noise.

Additionally or alternatively, said at least one projection comprises a serrated projection member.

The use of a serrated trailing edge allows for a gradual pressure equalization between pressure-side and suction-side airflows, reducing noise-causing turbulence effects.

Additionally or alternatively, at least a portion of said at least one projection is permeable, for example at least a portion of the projection may be perforated.

A permeable or perforated trailing edge further contributes to the pressure-equalising effect at the trailing edge.

Additionally or alternatively, at least a portion of said at least one wedge element comprises a corrugated or undulating surface.

Preferably, said at least one wedge element comprises an elongated wedge extending along at least a portion of the longitudinal direction of the wind turbine blade.

Said at least one wedge element may be located at any point along the longitudinal length of the wind turbine blade, between said tip end and said root end, preferably wherein the increase in blade trailing edge solid angle leads to a reducing in blade operational noise.

In one aspect, said at least one wedge element is located along a midboard region of the wind turbine blade, preferably between approximately 10-90% of the blade length from said root end, further preferably between approximately 25-75% of the blade length from said root end.

In an alternative aspect, said at least one wedge element is located toward said root end of said wind turbine blade, e.g. on the inboard portion of the blade, preferably within 50% of the blade length from said root end, further preferably within 35% of said root end.

As the trailing edge noise is more prominent due to the presence of a larger trailing edge thickness, e.g. a blunt trailing edge, towards the inboard section of the blade, the wedge element results in the greatest impact on blade operational noise by being located in this region of the blade. Furthermore, as the midboard or outboard sections of the blade experience higher relative wind speeds, the use of the wedge element acts to reduce the greater trailing edge noise in these sections.

Preferably, said at least one wedge element has a substantially triangular-shaped cross-section, wherein the at least one wedge element comprises:

a first end located towards said trailing edge;
a second end located towards said leading edge;
a base side extending between said first end and said second end adjacent a surface of said airfoil contour; and
a distal apex point located between said first end and said second end opposite said base side, wherein the at least one wedge element further comprises a first inclined or curved or sloped surface extending between said distal apex point and said first end and a second inclined or curved or sloped surface extending between said distal apex point and said second end, and wherein said first and second surfaces are shaped to provide for attached flow over said at least one wedge element.

The shape of the wedge element is selected to allow airflow to be guided over the wedge element and redirected into the trailing edge wake to reduce blunt trailing edge noise, preferably attached flow guided from the distal apex point and the first end, without being separated from the desired airflow direction.

Preferably, the length of the base side of said wedge element is between approximately 5-15% of the chord length, preferably between approximately 5-10% of the chord length, further preferably approximately 10%.

It will be understood that, as the cross-sectional profile of the wind turbine blade varies along the longitudinal direction of the blade, the dimensions of the wedge element may accordingly vary along the longitudinal direction based on the cross-sectional dimensions.

In one embodiment, the distance between the projection of said distal apex point into said base side and said first end is greater than or equal to the distance between the projection of said distal apex point into said base side and said second end.

Such a construction of wedge element will allow for a gradual redirection of flow about the wedge element near to airfoil trailing edge and will avoid any flow separation and thereby lowering the resulting drag, and hence minimize the aerodynamic losses. The wedge element can impact aerodynamically both as a load shaver and lift enhancement depending on the airfoil thickness and its design.

Additionally or alternatively, said distal apex point is located at a distance $h_{max}$ from said base side, wherein distance $h_{max}$ may vary along the span length of said at least one wedge element.

Different dimensions of the wedge element may be used to provide for different noise reduction qualities for different blade regions, along the length of the blade.

In one aspect, said at least one wedge element has a substantially triangular-shaped cross-section, wherein the at least one wedge element comprises:

a first end located towards said trailing edge;
a second end located towards said leading edge;
a base side extending between said first end and said second end adjacent a surface of said airfoil contour; and
a distal apex point located between said first end and said second end opposite said base side, and wherein
$L_{te}$ is the distance along the base side between the first end of the wedge element and the projection of the distal apex point onto the base side,
$L_{le}$ is the distance along the base side between the second end of the wedge element and the projection of the distal apex point onto the base side, and
L is the length of the base side between the first end and the second end, wherein
$L=L_{te}+L_{le}$, preferably 5%<L<15% of the chord length of the blade airfoil profile, preferably 5%<L<10% of the chord length of the blade airfoil profile, further preferably approximately L=10% of the chord length.

It will be understood that the chord length of the blade airfoil profile may be taken as an average value for the chord length along that section of the blade airfoil that the wedge element extends along. Alternatively, the dimensions and profile of the wedge element may change along the length of the blade, based on the changing chord length of the blade airfoil profile along the length of the wind turbine blade.

Preferably, $L_{le} \leq L_{te}$, further preferably $L_{le} < L_{te}$.

In a further aspect, $\Psi 2$ is the solid angle at said first end of said at least one wedge element, wherein
$5° < \Psi 2 < 15°$, preferably $5° < \Psi 2 < 10°$, further preferably approximately 7.5°.

It will be understood that a plurality of separate wedge elements may be used on a single blade.

There is also provided a wind turbine comprising at least one wind turbine blade as described above.

BRIEF DESCRIPTION OF THE DRAWINGS

Embodiments of the invention will now be described, by way of example only, with reference to the accompanying drawings, in which.

DETAILED DESCRIPTION

Figure 1:
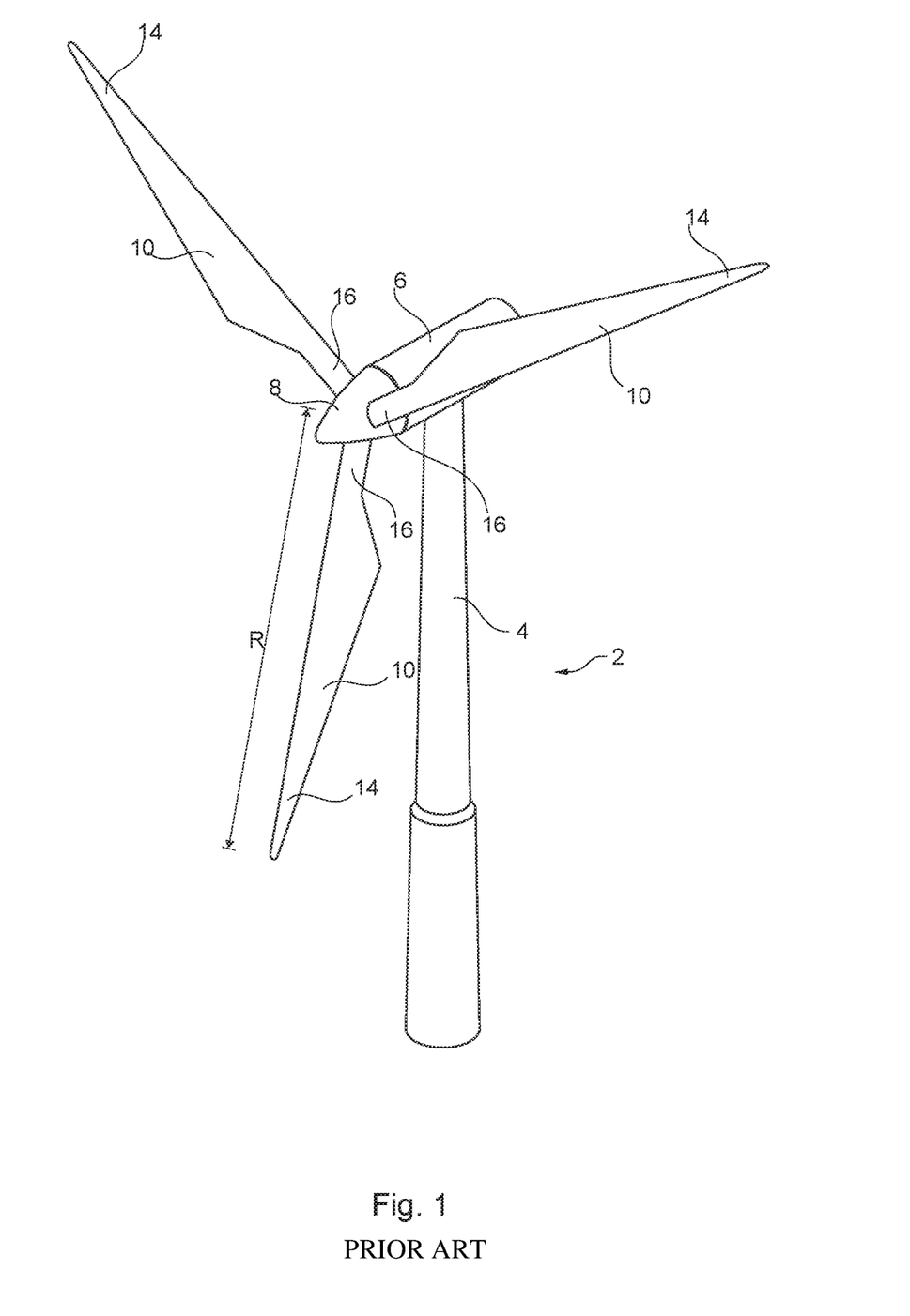
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
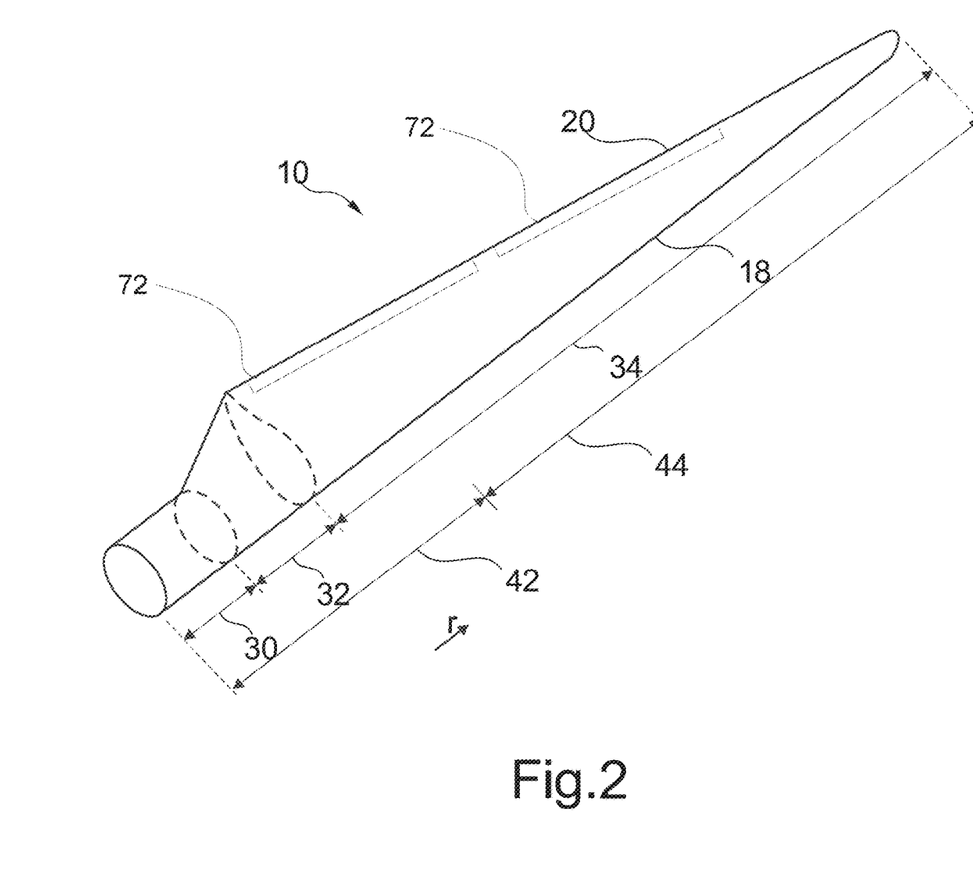
FIG. 2 shows a schematic view of a wind turbine blade.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

Figure 3:
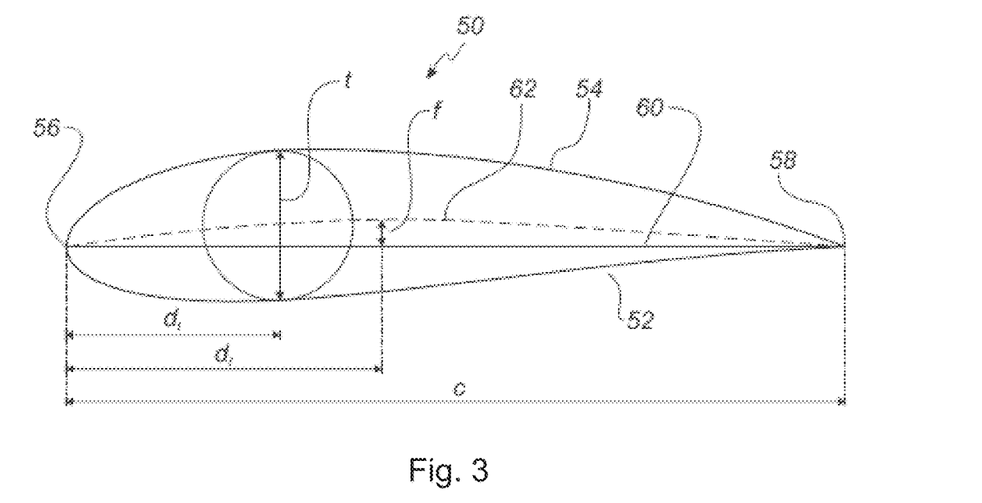
FIG. 3 shows a schematic view of an airfoil profile of a wind turbine blade.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50, as shown in FIG. 3, of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre -bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c. While the profile shown in FIG. 3 shows a tapered blade trailing edge, it will be understood that this is for illustrative purposes, and that the invention primarily relates to blades having a blunt trailing edge profile.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 metres in length, having blade root diameters of several metres.

An airfoil having a blunt trailing edge profile can be further characterised by the aerodynamic property of the trailing edge solid angle of the profile. The trailing edge solid angle, $\Psi$, is the solid angle between the pressure- and suction-side surfaces of the airfoil just upstream of the trailing edge, and is measured in degrees. It can be understood that the projection of the pressure- and suction-side surfaces is based on the plane of the respective surfaces immediately adjacent the profile trailing edge. Such adjacent surfaces may be defined as the surfaces within a distance of e.g. 10 cm of the blade trailing edge, or may be defined as the surfaces within a distance of e.g. 1%, 2%, 5% of the chord from the blade trailing edge.

Figure 11A:
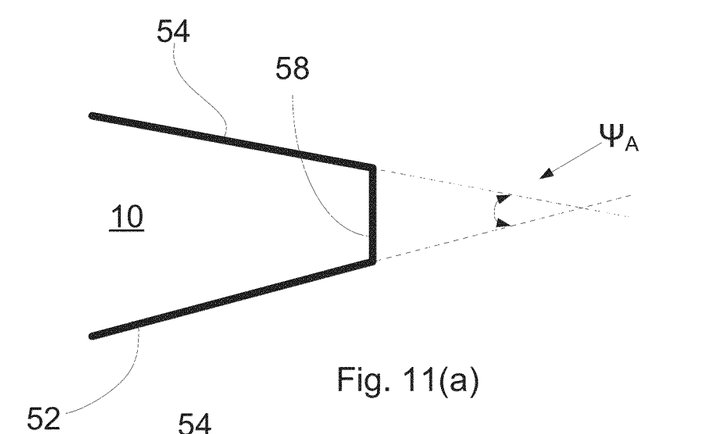
FIG. 11 illustrates examples of trailing edge solid angles for different blunt trailing edge airfoil profiles.

With reference to FIG. 11, a first example of a blunt trailing edge solid angle is illustrated in FIG. 11(a), wherein the surface of the pressure- and suction-side surfaces 52,54 immediately adjacent the blunt trailing edge are projected into the area beyond the trailing edge 58, where the projections intersect at the trailing edge solid angle $\Psi_A \approx 15°$.

Figure 11B:
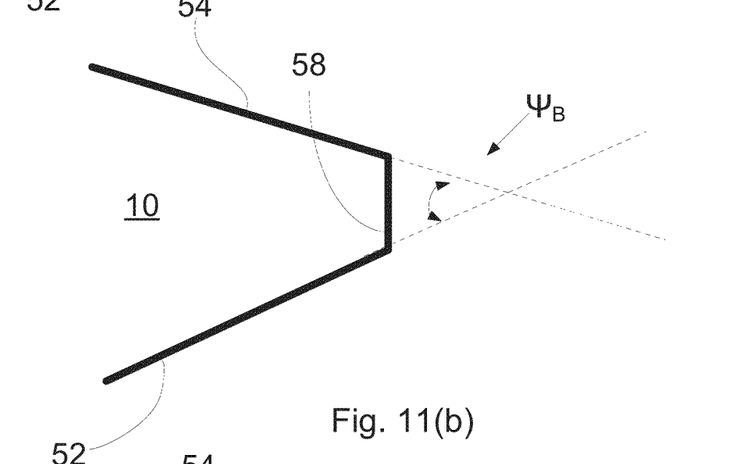

In FIG. 11(b), a second example of a blunt trailing edge is shown, wherein the pressure- and suction-side surfaces 52,54 adjacent the blunt trailing edge 58 form a projected trailing edge solid angle $\Psi_B \approx 30°$.

Figure 11C:
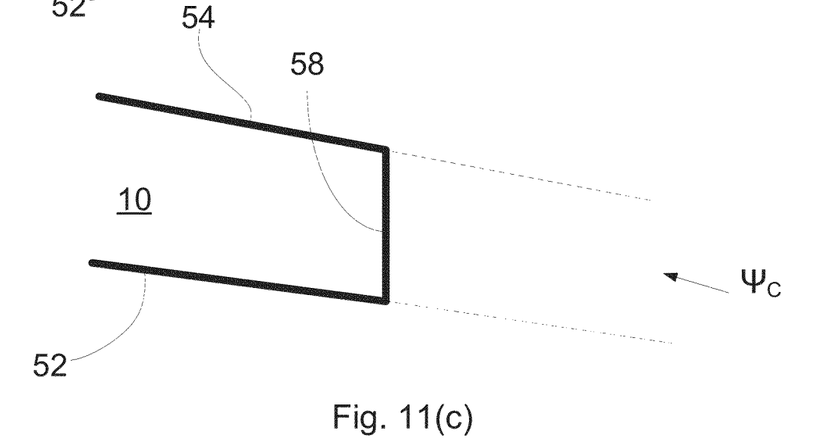

In FIG. 11(c), the relatively "flat" trailing edge section, having substantially parallel pressure- and suction-side surfaces 52,54 adjacent the trailing edge 58, results in a trailing edge solid angle $\Psi_C \approx 0°$.

It has been found that, as airflow over an airfoil leaves the airfoil at the airfoil trailing edge, the presence of a blunt trailing edge results in increased noise due to the vortex shedding formed in the wake of the blunt trailing edge, when the pressure- and suction-side flows meet. Such vortex shedding is a product of a Karman vortex street, which is a repeating pattern of swirling vortices caused by the unsteady separation of flow of a fluid around blunt bodies.

By increasing the trailing edge solid angle, the flow angle at which the pressure- and suction-side flows leave the airfoil trailing edge also increases. Increased flow angle reduces the wake length behind the trailing edge, which means that the vortex pattern behind the trailing edge is not sustained over a longer distance, hence affecting tonal noise levels. The increase in the trailing edge solid angle effectively moves the intersection point of the pressure- and suction-side flows closer to the airfoil trailing edge, thereby reducing the wake distance behind the trailing edge which forms a Karman vortex street.

Figure 4:
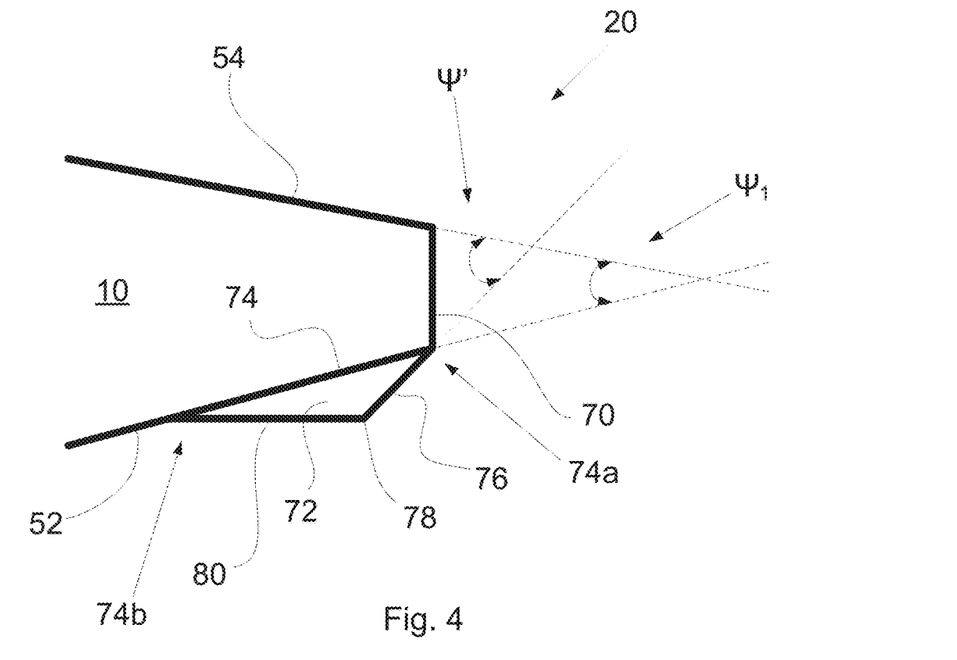
FIG. 4 illustrates an enlarged cross-sectional view of a blade trailing edge according to a first embodiment of the invention.

With reference to FIG. 4, an enlarged cross-sectional view of a blunt trailing edge 20 is illustrated. The blunt trailing edge surface 70 extends between the pressure side 52 and the suction side 54 surfaces at the blade trailing edge 20. The blade trailing edge 20 comprises a trailing edge solid angle $\Psi 1$ at the trailing edge, taken as a projection from the pressure and suction sides 52,54 of the blade 10.

Figure 5A:
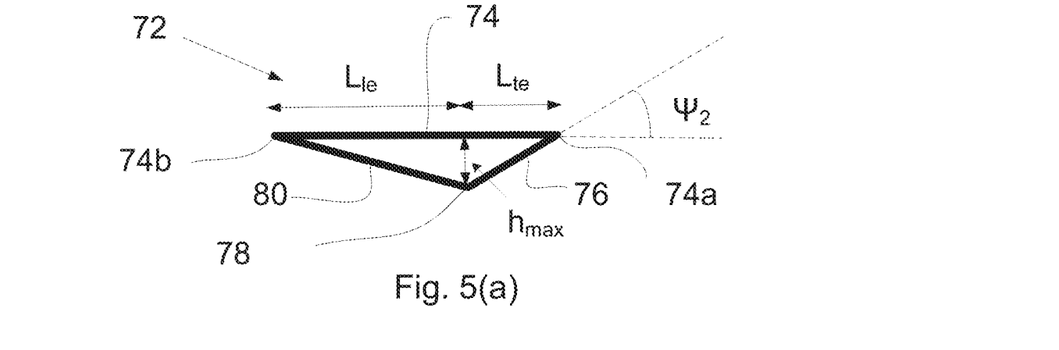
FIG. 5 shows enlarged cross-sectional views of wedge elements used in embodiments of the invention.

A wedge element 72 is provided on the pressure side 52 of the blade 10 adjacent the blade trailing edge 20. The wedge element 72 comprises a base surface 74 having a first end 74a located at the trailing edge 20 and a second end 74b located towards the leading edge 18 of the blade 10. A first surface 76 of the wedge element 72 extends from the first end 74a of the element 72 to a distal apex point 78, and a second surface 80 of the wedge element 72 extends from the second end 74b of the element 72 to said distal apex point 78, such that the wedge element 72 comprises a substantially triangularly-shaped cross-section. With reference to FIG. 5(a), the wedge element 72 itself comprises a solid angle $\Psi 2$ at said first end 74a. It will be understood that the solid angle $\Psi 2$ of the wedge element 72 at the first end 74a is that angle formed by the angle between the surfaces 174,176 adjacent the first end 74a.

Returning to the illustration of FIG. 4, when the wedge element 72 is provided at the trailing edge 20 of a blade 10, it acts to increase the blade trailing edge solid angle at the trailing edge 20 to an effective trailing edge solid angle $\Psi'$, where $\Psi'=\Psi1+\Psi2$. I.e. the blade trailing edge solid angle is increased from $\Psi1$ by the magnitude of the solid angle $\Psi2$ provided by the wedge element 72.

In use, attached flow over the pressure side 52 of the airfoil profile of the blade 10 is diverted by the wedge 72, firstly along the second surface 80, around the apex point 78, and subsequently attached to the first surface 76 of the wedge element 72 before reaching the blade trailing edge 20. As the attached flow leaves the airfoil at a larger flow angle than for an unaltered blade profile, greater mixing of the suction side and pressure side flows will occur, which will reduce the strength of the vortex shedding or Karman street formed behind the blunt trailing edge surface 70. Accordingly, less tonal noise will be created in the blade wake, resulting in a reduction in blade operational noise. It is seen that, through the selection of an appropriate wedge element 72, a significant decrease in blade trailing edge noise can be achieved with minimal impact on blade aerodynamics.

It will be understood that the wedge element 72 is shaped to allow airflow to be guided over the wedge element 72 and redirected into the trailing edge wake to reduce blunt trailing edge noise, in particular, the wedge element 72 is shaped to provide for attached flow between the apex point 78 of the wedge element 72 and the trailing edge 20 of the blade 10, without being separated from the desired airflow direction. Accordingly, the wedge element 72 may comprise any suitable cross-sectional profile.

With reference to FIG. 5(a), the wedge element 72 is preferably defined by the following characteristic values:

$h_{max}$ is the maximum height of the wedge element 72 at the apex point 78;

$L_{te}$ is the distance along the base surface 74 between the first end 74a of the wedge element 72 and the projection of the apex point 78 onto the base surface 74;

$L_{le}$ is the distance along the base surface 74 between the second end 74b of the wedge element 72 and the projection of the apex point 78 onto the base surface 74; and $\Psi2$ is the solid angle seen at said first end 74a.

Where $L=L_{te}+L_{le}$, preferably 5%<L<15% of the chord length of the blade airfoil profile, preferably 5%<L<10% of the chord length of the blade airfoil profile, further preferably approximately 10% of the chord length.

Preferably, $5°<\Psi2<15°$, preferably $5°<\Psi2<10°$, further preferably approximately 7.5°.

Preferably, $L_{le}<L_{te}$, further preferably $L_{le}\ll L_{te}$.

Such a construction of wedge element will allow for a gradual redirection of flow about the wedge element near to airfoil trailing edge and will avoid the drag due to separation and minimize the aerodynamic losses. The wedge element can impact aerodynamically both as a load shaver and lift enhancement depending on the airfoil thickness and its design.

Based on an analysis using 18%, 21%, 24%, and 36% thick airfoils, an approximate 3 dBA reduction in blade sectional trailing edge noise and a 1 dBA reduction in total noise were observed in a device having L approximately equal to 10% chord length and 7.5 degrees as a solid angle. This configuration was found as the most valuable configuration in terms of noise reduction as well as minimal aerodynamic impact.

Figure 5B:
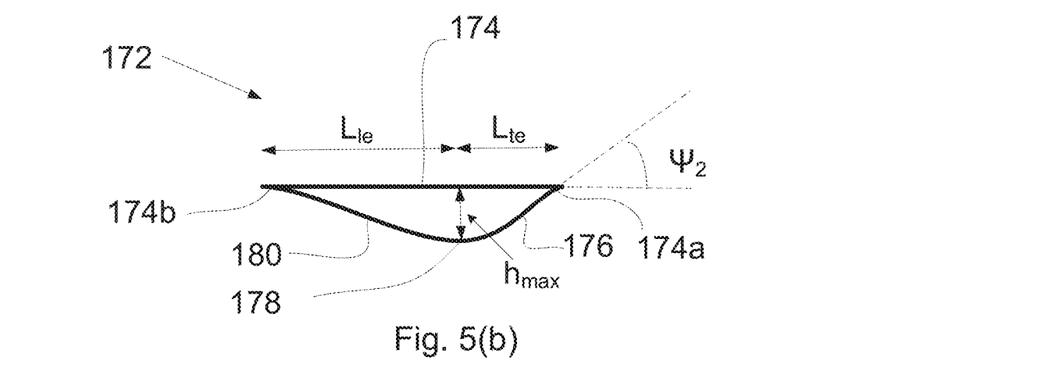
Figure 6:
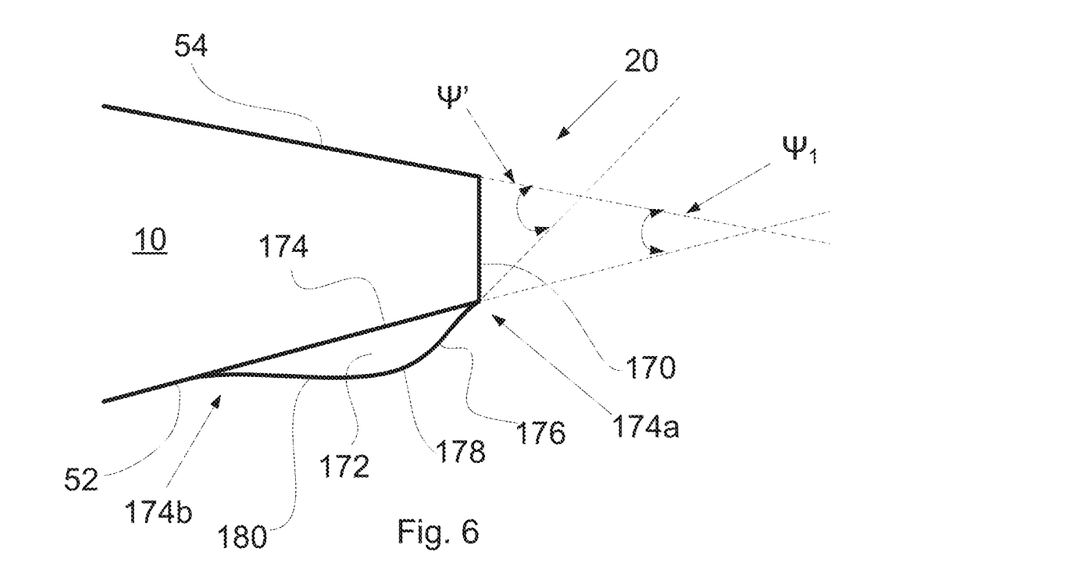
FIG. 6 illustrates an enlarged cross-sectional view of a blade trailing edge according to a second embodiment of the invention.

It will be understood that various alternative configuration of wedge elements may be utilised. With reference to FIGS. 5(b) and 6, an embodiment of the invention is shown where the wedge element 172 is provided as a curved or undulated element at the blade trailing edge 20. The wedge element 172 of this embodiment is provided with the same reference numerals to the above-described first embodiment with the addition of 100. In this embodiment, the first and second surfaces 176,180 of the wedge element 172 are curved such that the wedge element 172 has rounded corners, in particular at the apex point 178. Such a smoothed wedge element 172 results in a reduced negative impact on blade aerodynamics, and reduce the chances of flow separation.

Figure 7:
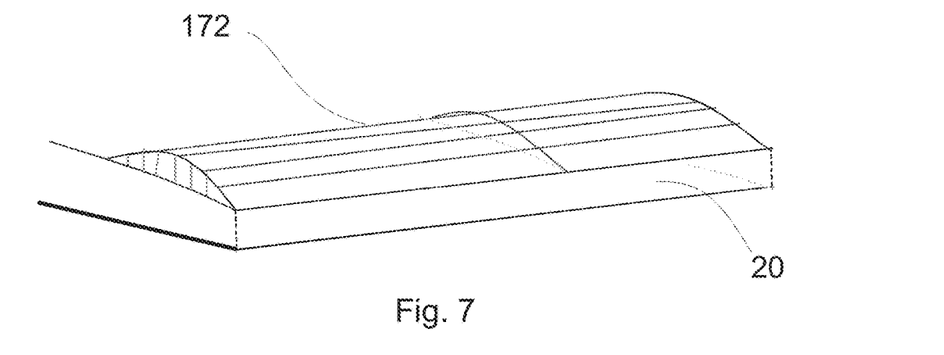
FIG. 7 is an isometric perspective view of the blade trailing edge of FIG. 5.

With reference to FIG. 7, an isometric view of a portion of a wedge element 172 provided at a blade trailing edge 20 is shown, looking towards the pressure side of the blade. It will be understood that the wedge element 172 may extend along a substantially all of the blade trailing edge, or at least a portion of the blade trailing edge. Preferably, the wedge element 72,172 is located along a portion of the blade trailing edge on the midboard section of the blade, or on the inboard section of the blade, as seen in FIG. 2, but it will be understood that any suitable arrangement may be used. Furthermore, a plurality of wedge elements 72,172 may be provided at different locations along the length of the wind turbine blade 10, as shown in FIG. 2.

Additionally, it will be understood that the profile of the wedge element may vary along the length of the blade. For example, the $h_{max}$, L, $L_{le}$, $L_{te}$, $\Psi2$ values may vary depending on the characteristic profile of the blade airfoil at that location along the length of the wind turbine blade. Furthermore, the wedge element may comprise any other suitable aerodynamic features, e.g. serrations, perforations, undulations or corrugations, fluid injection devices, etc., in order to improve the aerodynamic and noise performance of the wind turbine blade.

It will be understood that the wedge element may be incorporated into initial blade moulding and manufacturing steps. Additionally, the wedge element may be attached to existing blade designs as part of a retrofitting operation. Such attachment methods may include adhesives, bolting, a snap-fit arrangement, etc.

Figure 8A:
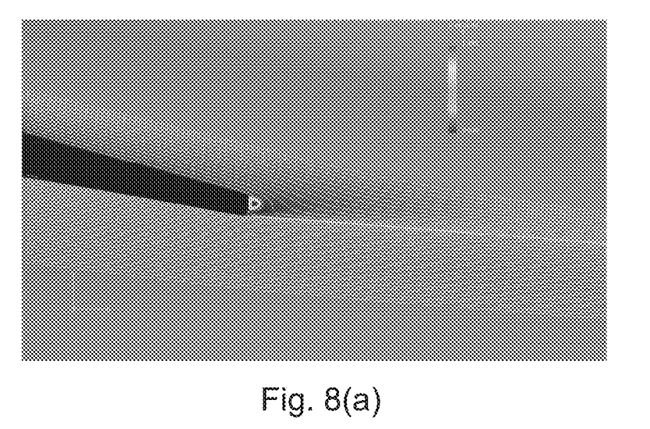
FIG. 8 shows a pair of plots of velocity magnitude contours with streamlines for a blade trailing edge having a wedge element according to the invention, and a prior art blade trailing edge without a wedge element according to the invention.
Figure 8B:
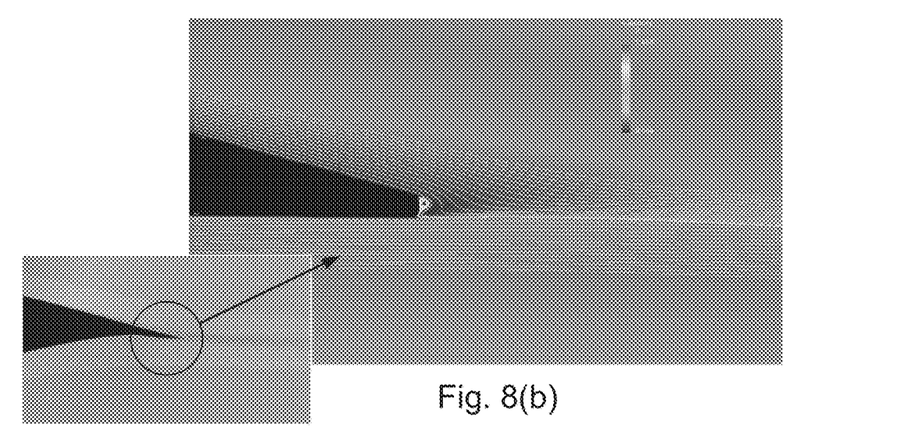

With reference to FIG. 8, a plot of velocity magnitude contours with streamlines are shown for sample airfoils. FIG. 8(a) shows the velocity magnitude contours for a clean version of an airfoil, i.e. without a wedge element according to the invention, while FIG. 8(b) shows the velocity magnitude contours for an airfoil having a wedge element according to the invention. It can be seen that the pressure side flow lines exit the airfoil of FIG. 8(b) with a greater solid angle than for the airfoil of FIG. 8(a), thereby reducing the area in which vortex shedding can commence in the wake of the blunt airfoil. Additionally, flow does not separate after the distal apex point.

Figure 9A:
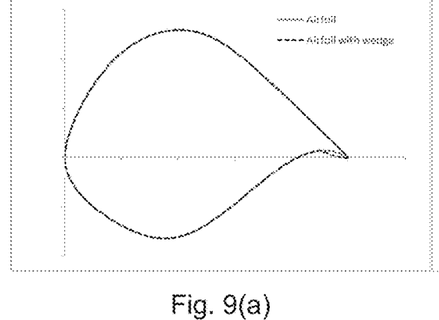
FIG. 9 illustrates a sample pair of airfoil profiles used in simulation, having both clean and wedge-based blunt trailing edges.
Figure 9B:
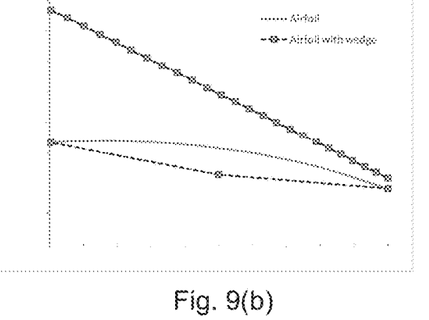

With reference to FIG. 9, plots showing the configuration of a pair of tested airfoil shapes are shown. FIG. 9(a) illustrates the overall airfoil profiles tested superimposed on one another, while FIG. 9(b) shows an enlarged version of the blade trailing edges of the profiles shown in FIG. 9(a). The simulations were carried out using a clean airfoil profile having a blunt trailing edge, and a modified airfoil profile, based on the original clean profile having a wedge element provided at the trailing edge pressure side of the profile. In this case, the $\Psi2$ was selected to be approximately 7.5°.

Figure 10A:
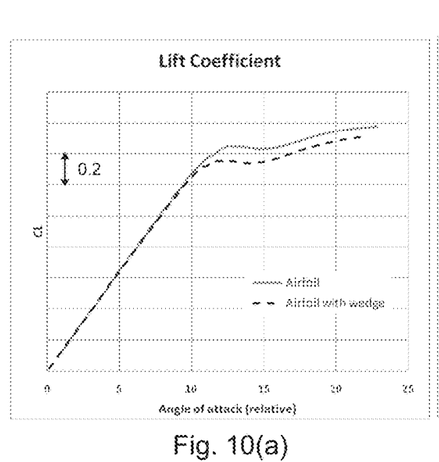
FIG. 10 presents plots of simulation results for lift coefficients and trailing edge noise levels based on the airfoil profiles of FIG. 9.
Figure 10B:
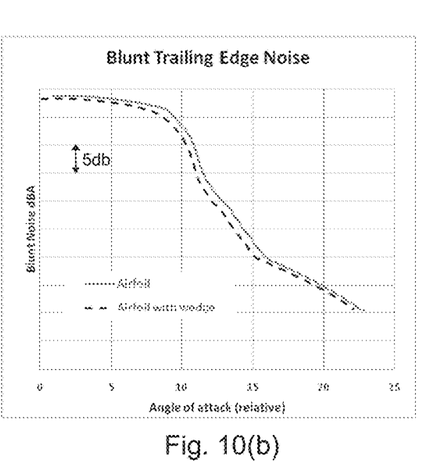

In FIG. 10, the results of the simulation tests are shown. FIG. 10(a) shows the coefficient of lift (Cl) for a range of Angles of Attack (AOA) for both the clean and wedge profiles, while FIG. 10(b) shows the blade blunt trailing edge noise measured for a range of Angles of Attack (AOA) for both the clean and wedge profiles It can be seen that for a minimal change in the lift coefficient near the stall point, the blunt trailing edge noise of the wedge profile is reduced across the measured AOA.

Accordingly, the invention provides a simple system for the reduction of blunt trailing edge operational noise which can be easily incorporated into wind turbine blade design, or retrofitted to existing blades.

In a further aspect, the invention allows for wind turbine blades to be manufactured having relatively thick or blunt trailing edges along the midboard and/or outboard sections of the blade, with reduced operational noise. A blade having a relatively thick or blunt trailing edge along the midboard and/or outboard sections of the blade is easier to manufacture and has increased structural strength when compared with a blade having a relatively thin trailing edge along the midboard and/or outboard sections. However, such thick trailing edge blades are typically avoided due to the relatively large trailing edge noise produced by the thick or blunt trailing edge midboard and outboard sections.

The use of a wedge element according to the invention on blade constructions having a thick or blunt midboard and/or outboard section provides for a reduction in trailing edge noise at these locations, thereby allowing for thick or blunt trailing edge blades to be more widely used. This provides for wind turbine blade construction having easier manufacturability, improved structural strength, and improved noise performance.

The invention is not limited to the embodiment described herein, and may be modified or adapted without departing from the scope of the present invention.

The invention claimed is:

1. A method of reducing a trailing edge noise of a wind turbine blade having a trailing edge, the wind turbine blade having a trailing edge solid angle at the trailing edge, wherein the trailing edge is a blunt trailing edge, and wherein at least one wedge element is located on an inboard portion of the wind turbine blade within 50% of a blade length from a root end of the wind turbine blade, the method comprising the steps of:
increasing the trailing edge solid angle of the trailing edge to reduce the strength of vortex shedding formed behind the trailing edge of the wind turbine blade.

2. The method of claim 1, wherein a pressure-side airflow and a suction side airflow over an airfoil profile of the wind turbine blade intersect in a wake of the trailing edge at an intersecting flow angle, and wherein the step of increasing the trailing edge solid angle of the blade acts to increase the intersecting flow angle.

3. The method of claim 1, wherein the method comprises the steps of:
providing a wind turbine blade having an airfoil profile comprising a trailing edge, the airfoil trailing edge having a trailing edge solid angle $\Psi1$; and
providing a wedge element adjacent the trailing edge, the wedge element having a first inclined or curved or sloped surface, the first inclined or curved or sloped surface tapered towards a first end provided at the trailing edge, the wedge element having a solid angle $\Psi2$ at the first end,
such that the wind turbine blade comprises an effective trailing edge solid angle $\Psi'$, wherein $\Psi'=\Psi1+\Psi2$.

4. The method of claim 3, wherein the wedge element is provided on a pressure side or an upwind side of the airfoil profile.

5. The method of claim 3, wherein the wedge element is provided wherein $\Psi2$ is between 5-15 degrees.

6. The method of claim 3, wherein the wedge element is provided as an add-on device which can be attached to an existing wind turbine blade.

7. The method of claim 3, wherein the wedge element is provided as an integral part of a wind turbine blade body.

8. The method of claim 3, wherein the airfoil profile and the wedge element are selected such that $\Psi'$ is less than 90 degrees.

9. The method of claim 8, wherein $\Psi'$ is less than 60 degrees.

10. A wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end,
the wind turbine blade further comprising a profiled airfoil contour including a pressure side and a suction side, as well as a leading edge and a trailing edge with a chord having a chord length extending therebetween, the profiled airfoil contour, when being impacted by an incident airflow, generating a lift, wherein the profiled airfoil contour comprises a trailing edge solid angle $\Psi1$ at said trailing edge,
wherein the wind turbine blade is configured to have an increased trailing edge solid angle at the trailing edge, compared to the trailing edge solid angle $\Psi1$, to reduce the strength of vortex shedding formed behind the trailing edge of the wind turbine blade,
wherein the trailing edge is a blunt trailing edge, and
wherein at least one wedge element is located on an inboard portion of the wind turbine blade within 50% of a blade length from the root end of the wind turbine blade.

11. The wind turbine blade of claim 10, wherein the wind turbine blade further comprises at least one wedge element provided on the pressure side and/or the suction side of the blade towards the trailing edge, the at least one wedge element having a first inclined or curved or sloped surface, the first inclined or curved or sloped surface tapered towards a first end provided at the trailing edge, and the wedge element having a solid angle $\Psi2$ at the first end,
such that the wind turbine blade comprises an effective trailing edge solid angle $\Psi'$ at the trailing edge of the wind turbine blade, wherein $\Psi'=\Psi1+\Psi2$.

12. The wind turbine blade of claim 11, wherein the at least one wedge element is provided on the pressure side or upwind side of the profiled airfoil contour.

13. The wind turbine blade of claim 11, wherein $\Psi2$ is between 5-15 degrees.

14. The wind turbine blade of claim 11, wherein each of the at least one wedge elements comprise at least one projection extending from the first end provided at the trailing edge, the projection acting to reduce vortex shedding in a wake of the wind turbine blade trailing edge.

15. The wind turbine blade of claim 11, wherein the at least one wedge element has a substantially triangular-shaped cross-section, wherein the at least one wedge element comprises:
a first end located towards the trailing edge;
a second end located towards the leading edge;
a base side extending between the first end and the second end adjacent a surface of the profiled airfoil contour; and
a distal apex point located between the first end and the second end opposite the base side, wherein the at least one wedge element further comprises a first inclined or curved or sloped surface extending between the distal apex point and the first end and a second inclined or curved or sloped surface extending between the distal apex point and the second end, and wherein the first and second surfaces are shaped to provide attached flow over the at least one wedge element.

16. The wind turbine blade of claim 15, wherein the distal apex point is located at a distance h from the base side, wherein distance h may vary along a length of the at least one wedge element.

17. The wind turbine blade of claim 10, wherein the at least one wedge element has a substantially triangular-shaped cross-section, wherein the at least one wedge element comprises:
 a first end located towards the trailing edge;
 a second end located towards the leading edge;
 a base side extending between the first end and the second end adjacent a surface of the profiled airfoil contour; and
 a distal apex point located between the first end and the second end opposite the base side, and wherein
 $L_{te}$ is the distance along the base side between the first end of the wedge element and a projection of the distal apex point onto the base side,
 $L_{le}$ is the distance along the base side between the second end of the wedge element and the projection of the distal apex point onto the base side, and
 L is the length of the base side between the first end and the second end, wherein
 $L=L_{te}+L_{le}$, 5%<L<15% of the chord length of the blade airfoil profile.

18. The wind turbine blade of claim 11, wherein the profiled airfoil contour and the wedge element are selected such that $\Psi''$ is less than 90 degrees.

19. A wind turbine comprising at least one wind turbine blade as claimed in claim 10.

20. The wind turbine blade of claim 17, wherein $L=L_{te}+L_{le}$, 5%<L<10% of the chord length of the blade airfoil profile.

21. The wind turbine blade of claim 18, wherein $\Psi''$ is less than 60 degrees.

* * * * *